(12) United States Patent  
Moon

(10) Patent No.: US 7,184,608 B2  
(45) Date of Patent: Feb. 27, 2007

(54) APPARATUS AND METHOD FOR EDGE ENHANCEMENT OF DIGITAL IMAGE DATA AND DIGITAL DISPLAY DEVICE INCLUDING EDGE ENHANCER

(75) Inventor: Seung-Hwan Moon, Yongin (KR)

(73) Assignee: Samsung Electronics Co., Ltd. (KR)

( * ) Notice: Subject to any disclaimer, the term of this patent is extended or adjusted under 35 U.S.C. 154(b) by 738 days.

(21) Appl. No.: 10/639,923

(22) Filed: Aug. 12, 2003

(65) Prior Publication Data

US 2004/0032991 A1  Feb. 19, 2004

(30) Foreign Application Priority Data

Aug. 13, 2002 (KR) ............ 10-2002-0047879

(51) Int. Cl.  
*G06K 9/40* (2006.01)

(52) U.S. Cl. ............ 382/266; 382/254; 382/263; 382/264

(58) Field of Classification Search ........ 382/266, 382/254, 263, 264, 252, 232, 239, 251; 358/1.9, 358/3.03, 1.1, 2.1, 515; 283/73; 380/54

See application file for complete search history.

(56) References Cited

U.S. PATENT DOCUMENTS 5,835,238 A * 11/1998 Mantell .................. 358/3.03  
6,608,700 B1 * 8/2003 Mantell .................... 358/1.9

* cited by examiner

*Primary Examiner*—Anh Hong Do  
(74) *Attorney, Agent, or Firm*—Cantor Colburn LLP

(57) ABSTRACT

A method of edge-enhancing digital image data is provided, which includes: storing first and second image data; calculating difference between the first image data and the second image data; calculating a modification value by dividing the calculated difference value by a predetermined modification constant; comparing the difference with a predetermined value; and modifying the first and the second image data based on the modification value such that the first image data is decreased and the second image data is increased when the value of difference between the first and the second image data is lower than the predetermined value, and the first image data is increased and the second image data is decreased when the value of difference between the first and the second image data is higher than the predetermined value.

16 Claims, 5 Drawing Sheets

APPARATUS AND METHOD FOR EDGE ENHANCEMENT OF DIGITAL IMAGE DATA AND DIGITAL DISPLAY DEVICE INCLUDING EDGE ENHANCER

BACKGROUND OF THE INVENTION (a) Field of the Invention

The present invention relates to an apparatus and a method for edge enhancement of digital image data and a digital display device including an edge enhancer.

(b) Description of the Related Art

As personal computers or television sets including display devices become light and slim, the display devices are required to be lighter and thinner. In order to satisfy such requirements, traditional cathode ray tubes (CRTs) are being substituted with flat panel displays such as a liquid crystal display (LCD).

A digital display device displays images based on digital image data from an image source such as a high definition television (HDTV) or a digital video disk (DVD). The digital display device frequently displays images including objects such as figures on a background and has a problem that outlines or edges of the objects are not clearly distinguished from the background when image data representing the edges of the objects are not much different from image data representing the background.

A conventional technique for edge enhancement identifies image data representing an object and image data representing a background among input image data using a separately equipped device. The conventional technique has problems that the identification is not easy and the equipment of the identification device increases production cost. Particularly, data representing an object and data representing a background from input data for motion pictures from an image source such as TV may be hardly distinguished.

SUMMARY OF THE INVENTION

It is a motivation of the present invention to clearly distinguish a background and objects to be displayed based on digital image data.

It is another motivation of the present invention to improve visibility without identification of background data and object data among input image data.

An edge enhancer for digital image data is provide, which includes: a register unit including first and second registers storing digital image data; a first calculator calculating difference between a first image data stored in the first register and a second image data stored in the second register; a second calculator for calculating a modification value by dividing the calculated difference by a predetermined modification constant; and a data modifier comparing the calculated difference with a predetermined value and modifying the first and the second image data based on the modification value depending upon the comparison.

Preferably, the data modifier decreases the first image data and increases the second image data when the calculated difference is lower than the predetermined value, and the data modifier increases the first image data and decreases the second image data when the value of difference between the first and the second image data is higher than the predetermined value.

The register unit may further include third and fourth registers storing the first and the second modified image data modified by the data modifier, respectively.

A method of edge-enhancing digital image data is provided, which includes: storing first and second image data; calculating difference between the first image data and the second image data; calculating a modification value by dividing the calculated difference value by a predetermined modification constant; comparing the difference with a predetermined value; and modifying the first and the second image data based on the modification value such that the first image data is decreased and the second image data is increased when the value of difference between the first and the second image data is lower than the predetermined value, and the first image data is increased and the second image data is decreased when the value of difference between the first and the second image data is higher than the predetermined value.

According to an embodiment of the present invention, a digital display device includes: a panel including a plurality of gate lines extending in a row direction, a plurality of data lines extending in a column direction, and a plurality of pixels connected to the gate lines and the data lines, each pixel including a switching element connected to one of the gate lines and one of the data lines and a pixel electrode connected to the pixel electrode; a gate driver applying a gate voltage to the gate lines; a data driver applying data voltages corresponding to input image data to the data lines; and a controller comparing image data for two of the pixels adjacent to each other, modifying the image data such that the image data having a relatively low value is decreased and the image data having a relatively high value is increased, and transmitting the modified image data to the data driver.

According to another embodiment of the present invention, a digital display device including a plurality of pixels includes: a controller comparing image data for pixels adjacent to each other and modifying the image data such that the image data having a relatively low value is decreased and the image data having a relatively high value is decreased; an image data processing unit for processing the image data from the controller to be suitable for display; and a display unit for displaying images based on the image data processed by the image data processing unit.

The image data may include red, green and blue image data, and the comparison and the modification are preferably performed separately for each of the red, green and blue image data.

The controller preferably includes: a register unit including a first register storing a first image data and a second register storing a second image data; a first calculator calculating difference between the first image data and the second image data; a second calculator for calculating a modification value by dividing the calculated difference by a predetermined modification constant; and a data modifier comparing the calculated difference with a predetermined value and modifying the first and the second image data based on the modification value depending upon the comparison.

Preferably, the data modifier decreases the first image data and increases the second image data when the calculated difference is lower than the predetermined value, and the data modifier increases the first image data and decreases the second image data when the value of difference between the first and the second image data is higher than the predetermined value, thereby increasing difference between the first and the second image data.

The digital display device may further include an input unit for changing the modification constant.

An example of the digital display device is a liquid crystal display.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF THE PREFERRED EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

Now, edge enhancers, edge-enhancing methods, and digital display devices including edge enhancers are described in detail with reference to the drawings.

Figure 1:
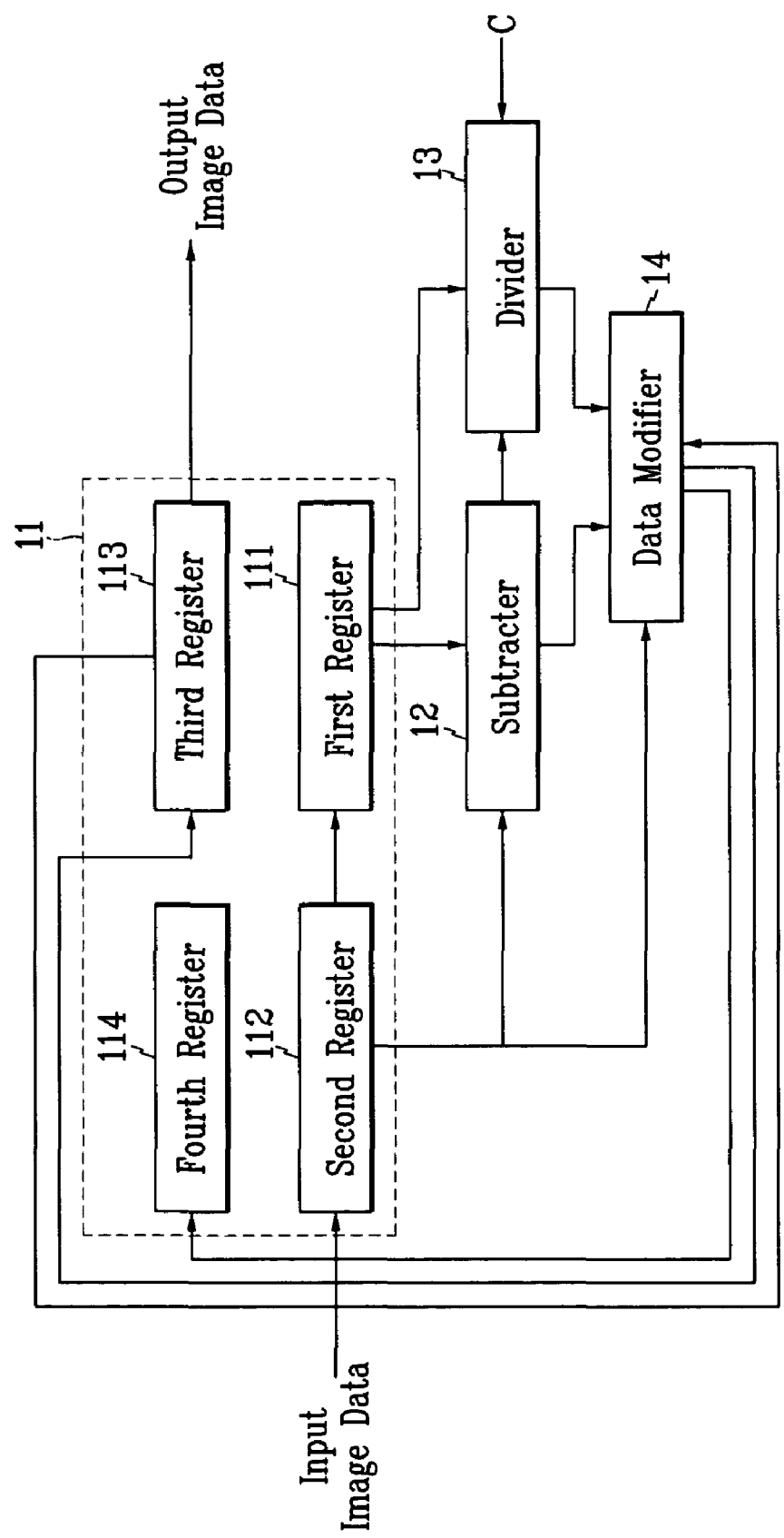
FIG. 1 is a block diagram of an edge enhancer for digital image data according to an embodiment of the present invention.

FIG. 1 is a block diagram of an edge enhancer for digital image data according to an embodiment of the present invention.

Referring to FIG. 1, an edge enhancer includes a register unit 11 storing image data, and a subtracter 12, a divider 13, and a data modifier 14 for processing the image data stored in the register unit 11.

The register unit 11 includes first and second registers 111 and 112 storing input image data sequentially input thereto, and third and fourth registers 113 and 114 temporally storing modified image data.

The subtracter 12 calculates the difference between the image data stored in the first register 111 and the image data stored in the second register 112. The divider 13 calculates a modification value by dividing the difference by a predetermined modification constant C.

The data modifier 14 compares the difference with a predetermined value, modifies the image data based on the modification value, and output the modified image data. In detail, the data modifier 14 decreases the image data having a relatively small value while it increases the image data having a relatively large value. In other words, the image data are modified such that the difference between the adjacent image data is emphasized much more.

For example, in case an (N+1)-th image data has a value larger than rather than an N-th image data by a predetermined value, the data modification is performed such that the N-th image data is increased while the (N+1)-th image data is decreased. On the contrary, in case the (N+1)-th image data has a value smaller than rather than the N-th image data by the predetermined value, the data modification is made such that the N-th image data is decreased while the (N+1)-th image data. The data modification emphasizes the difference between the adjacent image data to enhance the edges of objects to be displayed.

The operation of the edge enhancer will be now described in detail with reference to FIG. 2.

Figure 2:
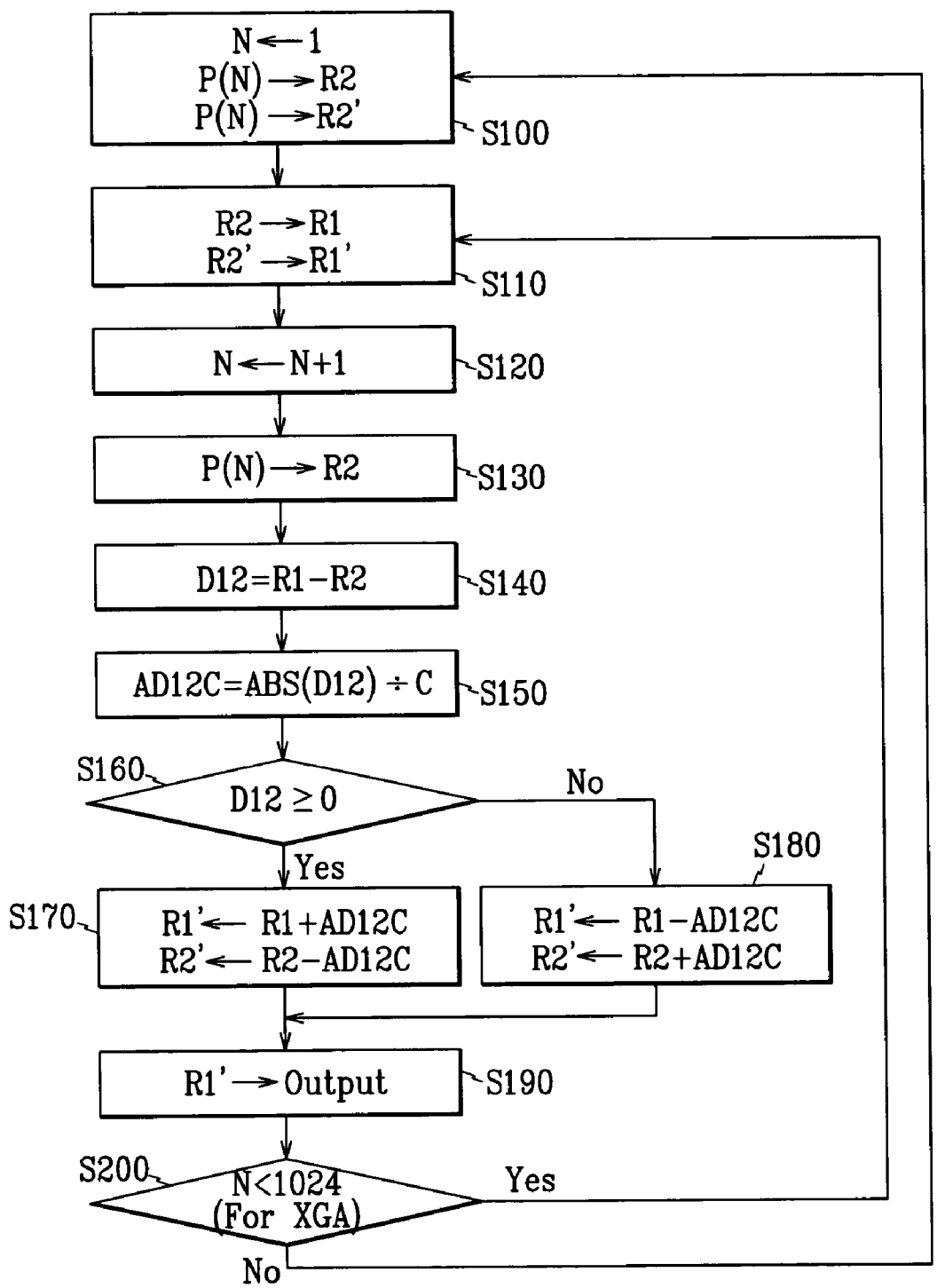
FIG. 2 is an exemplary flow chart illustrating the operation of the edge enhancer shown in FIG. 1 according to the embodiment of the present invention.

FIG. 2 is an exemplary flow chart illustrating the operation of the edge enhancer shown in FIG. 1 according to the embodiment of the present invention. In FIG. 2, P(N) indicates the image data for an N-th pixel, and R1, R2, R1' and R2' indicate the first register 111, the second register 112, the third register 113, and the fourth register, or data stored in the registers 111–114.

Digital image data from an image source (not shown) such as HDTV and DVD are sequentially input and stored into the first to the fourth registers 111–114 of the edge enhancer.

For instance, as shown in FIG. 2, an image data P1 for a first pixel are stored in the second and the fourth registers 112 and 114, and shifted into the first register 111 and the third register 112, respectively (S100 and S110). A subsequent input image data P2 for a second pixel are stored in the second register 112 (S120 and S130).

The subtracter 12 calculates the difference D12 between the first image data P1 stored in the first register 111 and the second image data P2 stored in the second register 112 (S140). The calculated difference D12 is fed to the divider 13.

The divider 13 divides the calculated difference D12 from the subtracter 12 (or a value related thereto) by a predetermined modification constant C to produce a modification value AD12C for image data modification (S150).

The difference value D12 and the modification value AD12C are input into the data modifier 14, and the data modifier 14 evaluates the difference value D12 between the first image data P1 and the second image data P2 (S160) and modifies the two image data P1 and P2 based on the modification value AD12C depending upon the evaluation (S170 and S180).

Specifically, when the difference value D12 is equal to or greater than a predetermined value (for example, "0"), the data modifier 14 determines that the image data are falling, and performs data modification such that the first image data P1 is increased while the second image data P2 is decreased. In detail, the data modifier 14 adds the modification value AD12C to the first image data P1 to produce a first modified image data P1', and subtracts the modification value AD12C from the second image data P2 to produce a second modified image data P2'. The first and the second modified image data P1' and P2' are stored in the third and the fourth registers 113 and 114 (S170).

When the difference value D12 between the first image data P1 and the second image data P2 is smaller than the predetermined value, the data modifier 14 determines that the image data are rising, and performs data modification such that the first image data P1 is decreased while the second image data P2 is decreased. In detail, the data modifier 14 subtracts the modification value AD12C from the first image data P1 to produce a first modified image data P1', and adds the modification value AD12C to the second image data P2 to produce a second modified image data P2'. The first and the second modified image data P1' and P2' are stored in the third and the fourth registers 113 and 114 (S180).

Thereafter, the data modifier 14 outputs the first modified image data P1' stored in the third register 113 (S190).

The data modifier 14 determines whether the image data for all the pixels in one row are input (S200).

For instance, in case the display device displays images in XGA resolution, the total number of pixels in a row amounts to 1024.

When the index N of the current input image data is smaller than 1024, that is, all the image data for the pixels in a row are not yet input, it returns to the step S110. In the step S110, the second image data P2 stored in the second register 112 is shifted into the first register 111, and the second modified image data P2' stored in the fourth register 114 is shifted into the third register 113.

When the image data for the next pixel are input, the above described steps of S120–S200 are repeated, and the edge enhancement is made based on the data stored in the first register 111 and the data stored in the second register 112, that is, based on the difference value between the previous input image data and the current input image data.

On the contrary, in the step S200, when the index N of the current image data is equal to or greater than 1024, it is determined that all the image data for the pixels in a row are input. Then, it returns to the step S100 and the edge enhancement is repeatedly made with respect to the image data for the pixels in a next row.

It is noted that when the difference value D12 between the first image data P1 and the second image data P2 equals to the predetermined value, the first and the second image data P1 and P2 are not modified since the modification value AD12C is equal to zero. However, the two image data may be modified even though their difference equals to zero.

The modified image data from the third register 113 are processed by an image processor (not shown), and displayed in a display unit (not shown).

The above-described edge enhancement adds a value into one of adjacent two image data and subtracts the same value from the other image data so that the sum of the addition and the subtraction equals to zero. Accordingly, the observed luminance may not be changed to maintain natural images.

Figure 3A:
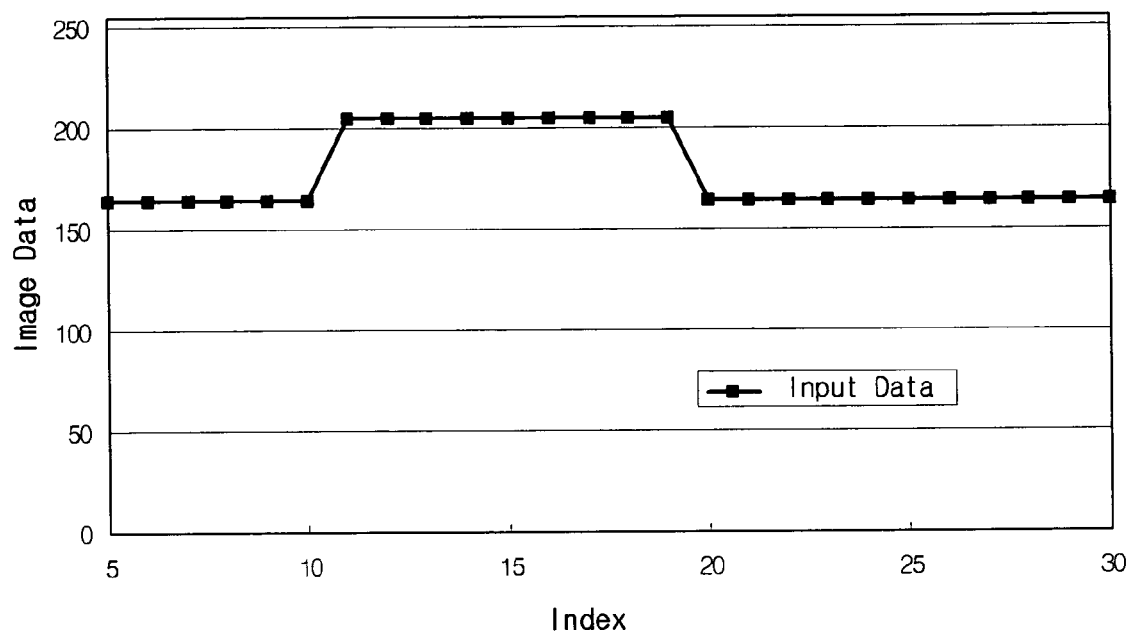
FIGS. 3A to 3C illustrate examples of image data processed by an edge enhancer according to embodiments of the present invention.
Figure 3B:
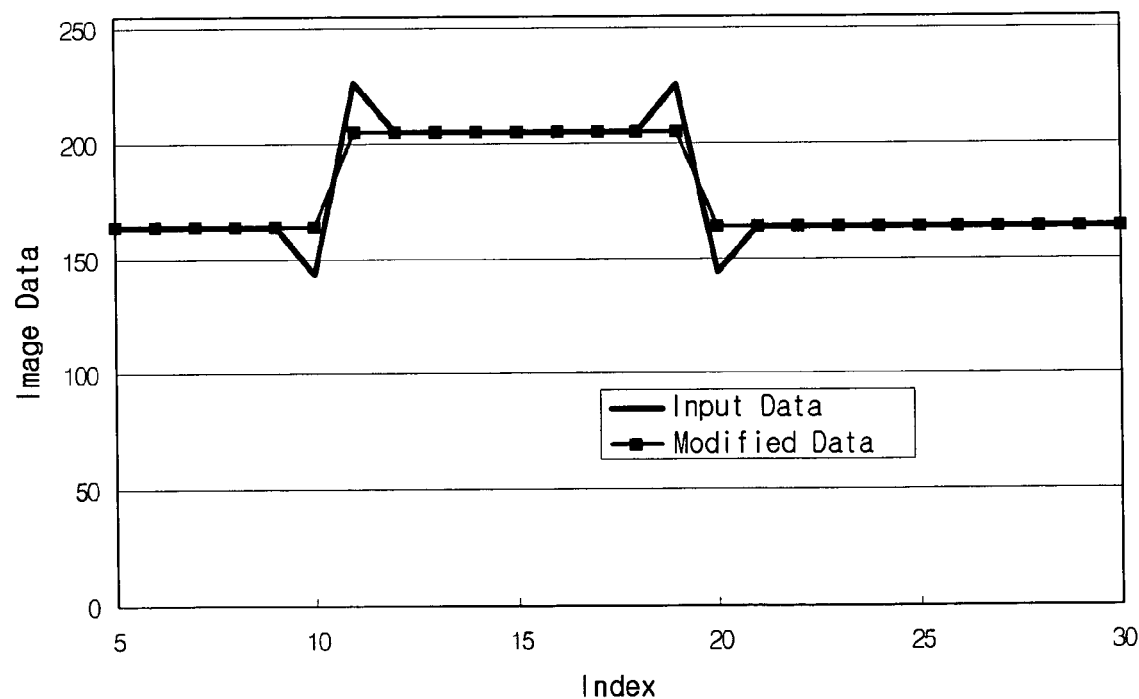
Figure 3C:
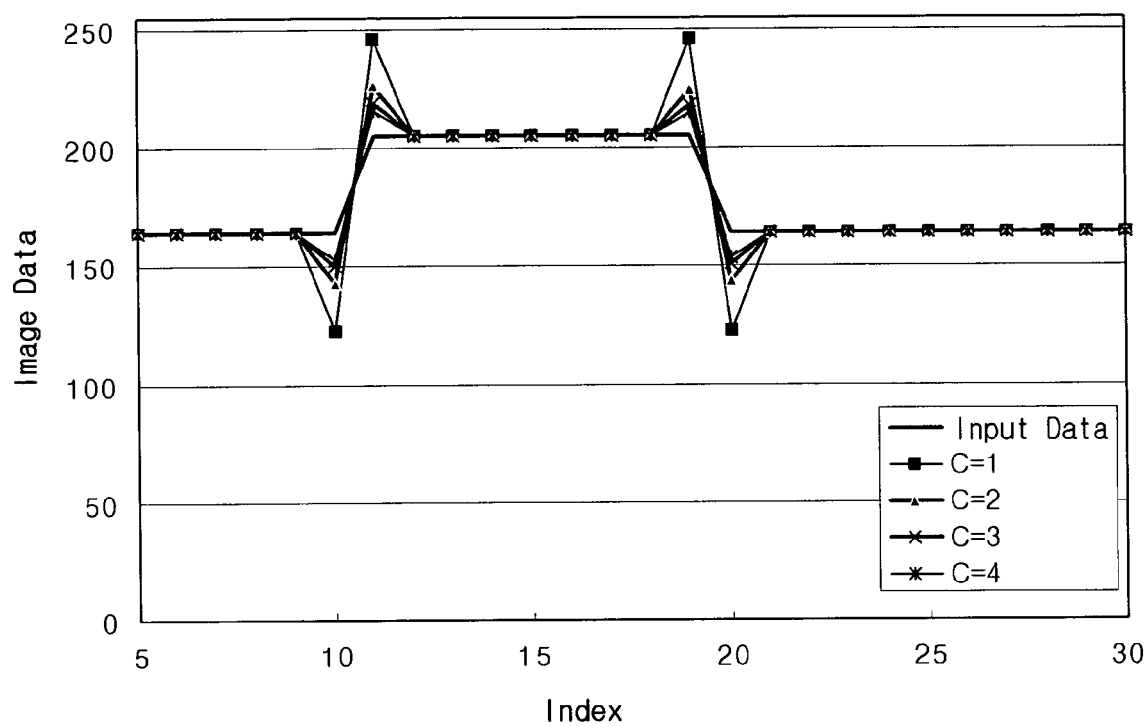

FIGS. 3A to 3C illustrate examples of image data processed by an edge enhancer according to embodiments of the present invention.

FIGS. 3A to 3C illustrate initial image data, edge-enhanced image data with a modification constant, and edge-enhance image data with various modification constants equal to 1, 2, 3 and 4, respectively, as function of index of pixels. When the gray difference or the data difference between adjacent pixels is so small that their boundaries are not distinctly displayed, a background and an object, for example, may not be clearly distinguished to make it difficult to obtain clear images.

As shown in FIGS. 3B and 3C, the gray difference between image data at a rising edge and at a falling edge is increased so that the boundaries between an object and a background, for example, can be emphasized to obtain clear outline of the object.

Meanwhile, the degree of the edge enhancement depends on the modification constant C. Too low modification constant C may deteriorate image quality, while too high modification constant C invalidates the edge enhancement. For instance, the edge enhancement for 8-bit data is preferably made such that the modification constant C is in a range of 0–255.

Accordingly, the optimized edge enhancement can be obtained by determining an appropriate modification constant C to establish a proper modification value AD12C. For this purpose, the edge enhancer may include a separate modification constant input unit for adjusting the modification constant C.

The modified data shown in FIG. 3B is obtained by using the modification constant C equal to two.

Figure 4:
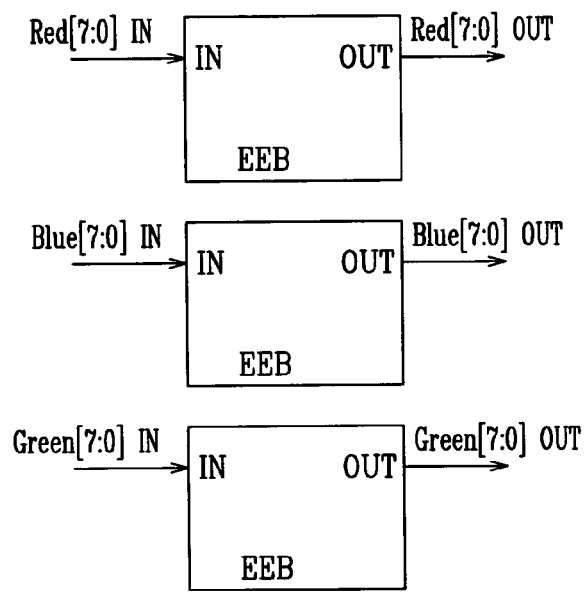
FIG. 4 illustrates edge enhancing blocks EEB for respective red, green and blue image data according to an embodiment of the present invention.

It is preferred that an edge enhancer is provided for each of primary colors such as red, green and blue such that the noises of red image data, green image data, and blue image data can be removed in a separate manner. FIG. 4 illustrates edge enhancing blocks EEB for respective red, green and blue image data.

The edge enhancer according to an embodiment of the present invention may be built in a digital image data processor which processes digital image data generated by analog to digital conversion (ADC).

Figure 5:
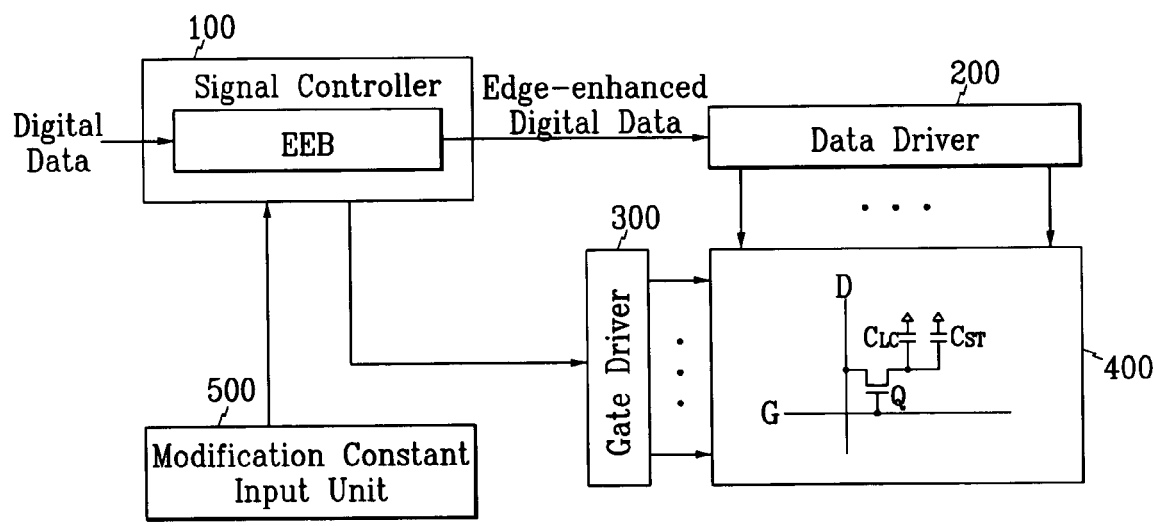
FIG. 5 is a block diagram of an LCD including an edge enhancer according to an embodiment of the present invention.

FIG. 5 is a block diagram of an LCD including an edge enhancer according to an embodiment of the present invention. However, an edge enhancer according to the embodiment of the present invention can be used in any type of digital display device.

As shown in FIG. 5, a liquid crystal display (LCD) according to an embodiment of the present invention includes a signal controller 100, a data driver 200, a gate driver 300, and a liquid crystal (LC) panel 400. The signal controller 100 includes an edge enhancement block EEB, which preferably has substantially the same configuration of the edge enhancer shown in FIG. 1. Furthermore, the LCD further includes a modification constant input unit 500 for adjusting the edge modification constant. The drivers 200 and 300 processes image data to be displayed, and the LC panel 400 displays the images from the drivers 200 and 300.

The LC panel 400 includes a plurality of data lines D, a plurality of gate lines G crossing the data lines D, and a plurality of pixels connected to the data lines D and the gate lines G.

Each pixel includes a switching element Q connected to the gate line G and the data line D, and an LC capacitor $C_{LC}$ and a storage capacitor $C_{ST}$ that are connected to the switching element Q. The storage capacitor $C_{ST}$ may be omitted if unnecessary.

The switching element Q such as a thin film transistor (TFT) is provided on the lower panel 100 and has three terminals: a control terminal connected to the gate line G; an input terminal connected to the data line D; and an output terminal connected to the LC capacitor $C_{LC}$ and the storage capacitor $C_{ST}$.

The LC capacitor $C_{LC}$ includes a pixel electrode (not shown), a common electrode (not shown), and a liquid crystal layer (not shown) as a dielectric between the pixel electrode and the common electrode. The pixel electrode is connected to the switching element Q, and the common electrode is supplied with a common voltage.

The storage capacitor $C_{ST}$ is an auxiliary capacitor for the LC capacitor $C_{LC}$. The storage capacitor $C_{ST}$ includes the pixel electrode and a separate signal line (not shown), which is supplied with a predetermined voltage such as the common voltage. Alternatively, the storage capacitor $C_{ST}$ includes the pixel electrode and an adjacent gate line called a previous gate line.

Upon receipt of digital RGB image data from an image source such as HDTV and DVD, the edge enhancement block EEB of the signal controller 100 performs edge modification based on a modification constant from the modification constant input unit 500 according to the difference between the neighboring image data for respective RGB image data to generate edge-enhanced image data, and transmits the edge-enhanced data to the data driver 200. Since the edge-enhancement amplifies any noise involved in the input image data, it is preferable that the noise is removed from the image data before the edge modification.

The data driver 200 stores the noise-free RGB image data from the signal controller 100 in a shift register of the data driver 200, and selects voltages corresponding to the respective data among the voltages from the gray voltage generator (not shown) and transmits the selected voltages to the data lines D of the panel 400 upon the receipt of a signal such as a LOAD signal from the signal controller 100. At this time, the gate driver 300 sequentially applies the gate-on voltage to the gate lines G in accordance with a control signal such as a CPV signal from the signal controller 100.

Consequently, the data voltage applied to the input terminal of the switching element Q in each pixel of the LC panel 400 via the data line D is charged in the liquid crystal capacitor $C_{LC}$. The orientations of the liquid crystal molecules are differentiated depending upon the voltages across the liquid crystal capacitor $C_{LC}$, and hence, the light transmittance through the liquid crystal layer is varied. In this way, the desired images are displayed such that the objects and the background can be clearly distinguished.

The user can control the degree of edge modification using the modification constant input unit 500 shown in FIG. 5 while watching the images displayed on a screen of an LCD. In this case, the signal controller 100 modifies the modification constant C depending upon the information from the input unit 500 such that the edge-enhancement block EEB can modify the input image data in an appropriate manner.

Other functions of the components of the liquid crystal display such as the gate driver, the data driver, the gray voltage generator, and the signal controller are well known in the art, and hence, detailed descriptions thereof will be omitted.

The edge enhancer according to an embodiment of the present invention is also applicable to various display devices such as PDP for processing and displaying digital image data.

Since the present invention requires no apparatus or process for identifying a background and an object among the input image data, time and cost for edge enhancement is reduced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An edge enhancer for digital image data, the edge enhancer comprising:
   a register unit including first and second registers storing digital image data;
   a first calculator calculating difference between a first image data stored in the first register and a second image data stored in the second register;
   a second calculator for calculating a modification value by dividing the calculated difference by a predetermined modification constant; and
   a data modifier comparing the calculated difference with a predetermined value and modifying the first and the second image data based on the modification value depending upon the comparison.

2. The edge enhancer of claim 1, wherein the data modifier decreases the first image data and increases the second image data when the calculated difference is lower than the predetermined value, and the data modifier increases the first image data and decreases the second image data when the value of difference between the first and the second image data is higher than the predetermined value, thereby increasing the difference between the first and the second image data.

3. The edge enhancer of claim 1, wherein the register unit further includes third and fourth registers storing the first and the second modified image data modified by the data modifier, respectively.

4. A method of edge-enhancing digital image data, the method comprising:
   storing first and second image data;
   calculating difference between the first image data and the second image data;
   calculating a modification value by dividing the calculated difference value by a predetermined modification constant;
   comparing the difference with a predetermined value; and
   modifying the first and the second image data based on the modification value such that the first image data is decreased and the second image data is increased when the value of difference between the first and the second image data is lower than the predetermined value, and the first image data is increased and the second image data is decreased when the value of difference between the first and the second image data is higher than the predetermined value.

5. A digital display device comprising:
   a panel including a plurality of gate lines extending in a row direction, a plurality of data lines extending in a column direction, and a plurality of pixels connected to the gate lines and the data lines, each pixel including a switching element connected to one of the gate lines and one of the data lines and a pixel electrode connected to the pixel electrode;
   a gate driver applying a gate voltage to the gate lines;
   a data driver applying data voltages corresponding to input image data to the data lines; and
   a controller comparing image data for two of the pixels adjacent to each other, modifying the image data such that the image data having a relatively low value is decreased and the image data having a relatively high value is increased, and transmitting the modified image data to the data driver.

6. The digital display device of claim 5, wherein the image data includes red, green and blue image data, and the comparison and the modification are performed separately for each of the red, green and blue image data.

7. The digital display device of claim 5, wherein the controller comprises:
   a register unit including a first register storing a first image data and a second register storing a second image data;
   a first calculator calculating difference between the first image data and the second image data;
   a second calculator for calculating a modification value by dividing the calculated difference by a predetermined modification constant; and
   a data modifier comparing the calculated difference with a predetermined value and modifying the first and the second image data based on the modification value depending upon the comparison.

8. The digital display device of claim 7, wherein the data modifier decreases the first image data and increases the second image data when the calculated difference is lower than the predetermined value, and the data modifier increases the first image data and decreases the second image data when the value of difference between the first and the second image data is higher than the predetermined value, thereby increasing difference between the first and the second image data.

9. The digital display device of claim 7, further comprising an input unit for changing the modification constant.

10. The digital display device of claim 5, wherein the digital display device is a liquid crystal display.

11. A digital display device including a plurality of pixels, the digital display device comprising:
   a controller comparing image data for pixels adjacent to each other and modifying the image data such that the image data having a relatively low value is decreased and the image data having a relatively high value is decreased;
   an image data processing unit for processing the image data from the controller to be suitable for display; and
   a display unit for displaying images based on the image data processed by the image data processing unit.

12. The digital display device of claim 11, wherein the image data includes red, green and blue image data, and the comparison and the modification are performed separately for each of the red, green and blue image data.

13. The digital display device of claim 11, wherein the controller comprises:
   a register unit including a first register storing a first image data and a second register storing a second image data;
   a first calculator calculating difference between the first image data and the second image data;
   a second calculator for calculating a modification value by dividing the calculated difference by a predetermined modification constant; and
   a data modifier comparing the calculated difference with a predetermined value and modifying the first and the second image data based on the modification value depending upon the comparison.

14. The digital display device of claim 13, wherein the data modifier decreases the first image data and increases the second image data when the calculated difference is lower than the predetermined value, and the data modifier increases the first image data and decreases the second image data when the value of difference between the first and the second image data is higher than the predetermined value, thereby increasing difference between the first and the second image data.

15. The digital display device of claim 13, further comprising an input unit for changing the modification constant.

16. The digital display device of claim 11, wherein the digital display device is a liquid crystal display.

* * * * *